No. 634,831. Patented Oct. 10, 1899.
A. N. OZIAS.
PRICE SCALE.
(Application filed Oct. 6, 1898.)
(No Model.) 4 Sheets—Sheet 1.
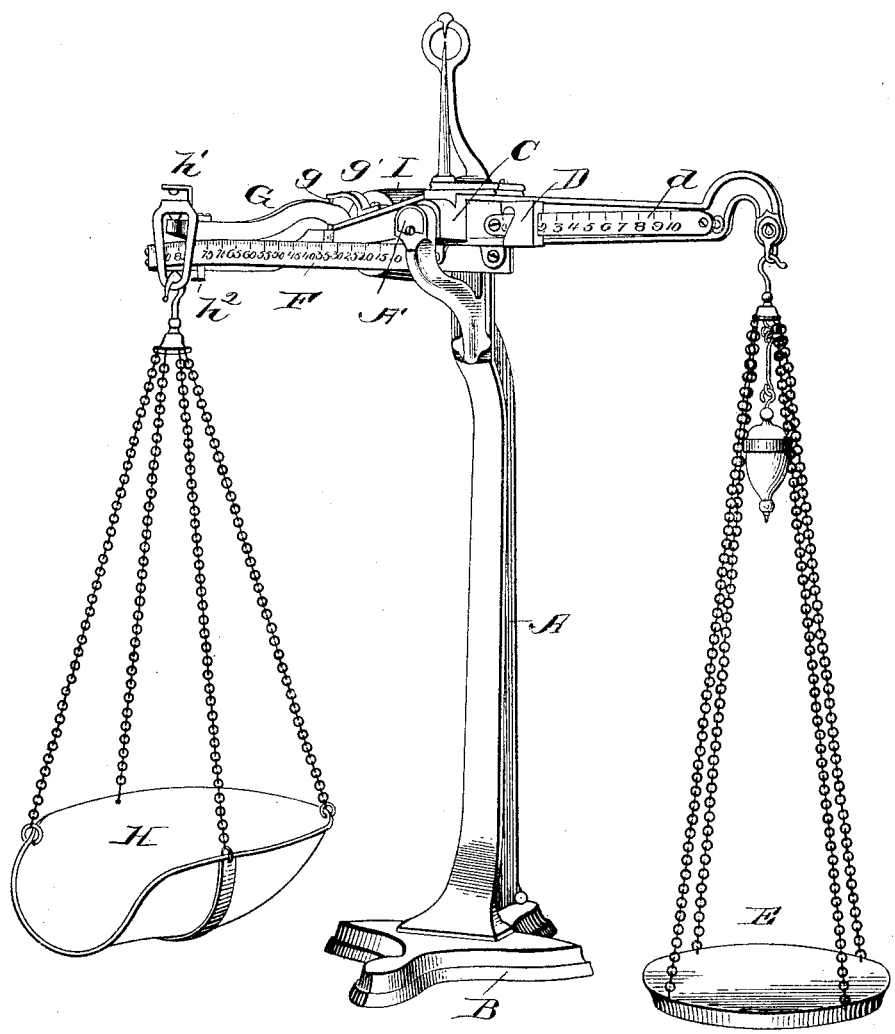
Witnesses:
J. M. Fowler Jr.
Alexander J. Stewart
Inventor:
Albert N. Ozias
by Church & Church
his Attorneys No. 634,831. Patented Oct. 10, 1899.
A. N. OZIAS.
PRICE SCALE.
(Application filed Oct. 6, 1898.)
(No Model.) 4 Sheets—Sheet 2.
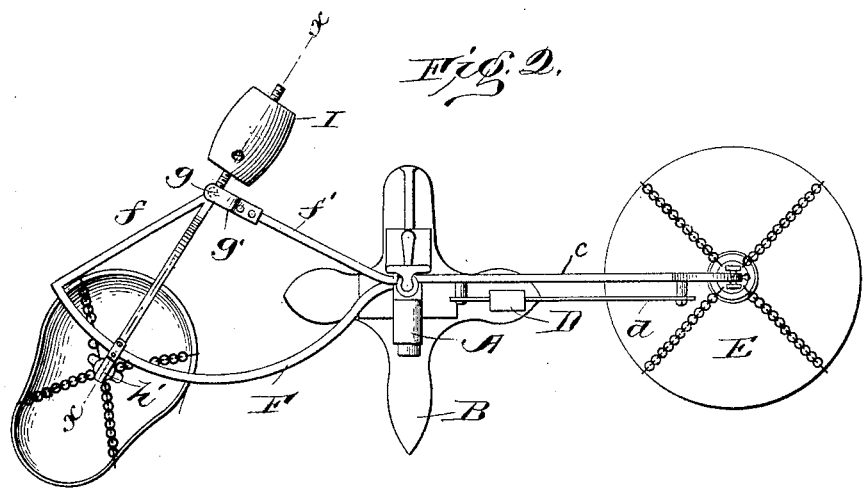
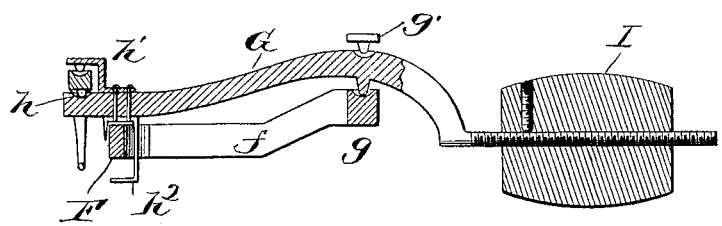

No. 634,831. Patented Oct. 10, 1899.
A. N. OZIAS.
PRICE SCALE.
(Application filed Oct. 6, 1898.)
(No Model.) 4 Sheets—Sheet 3.
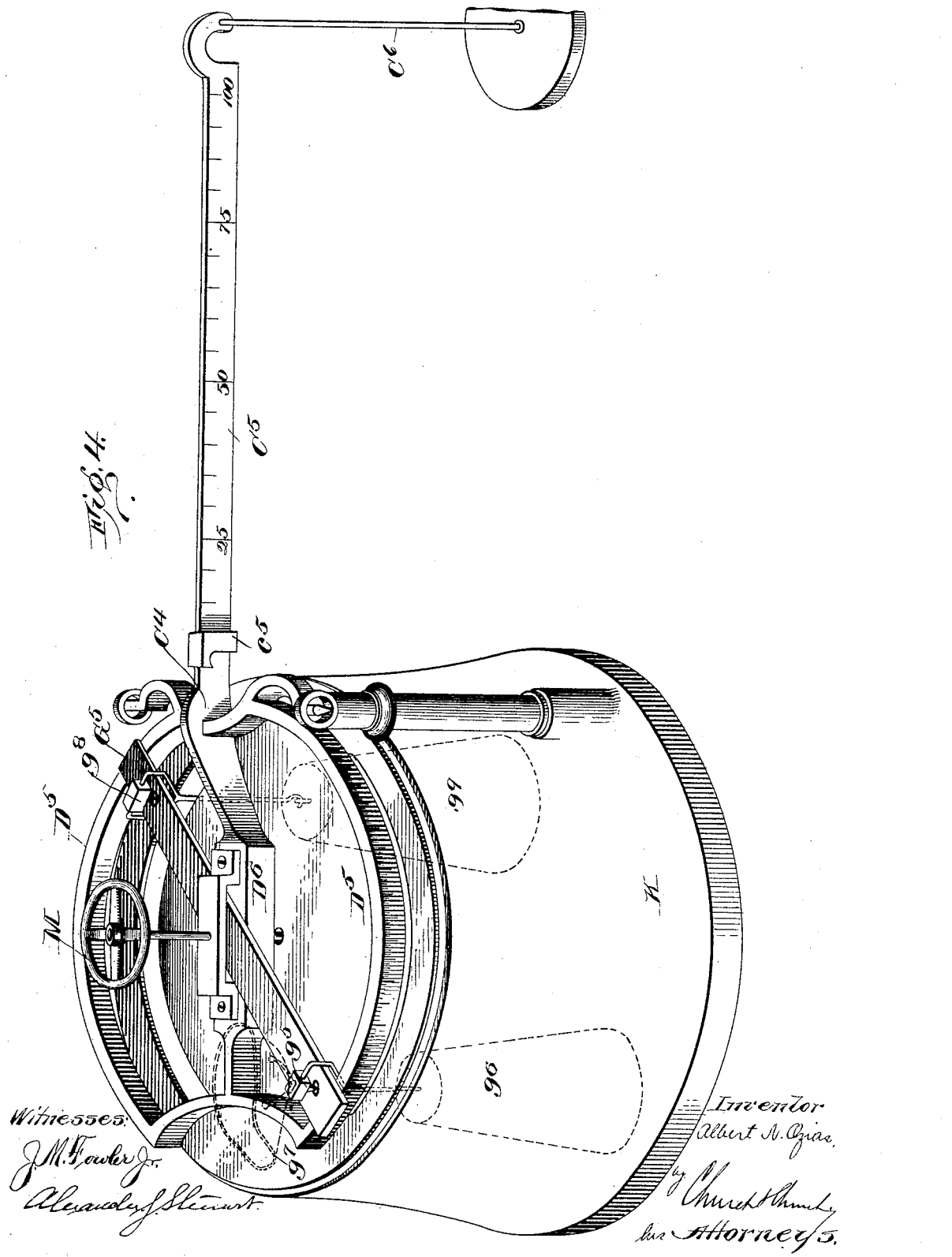

No. 634,831. Patented Oct. 10, 1899.
A. N. OZIAS.
PRICE SCALE.
(Application filed Oct. 6, 1898.)
(No Model.) 4 Sheets—Sheet 4.
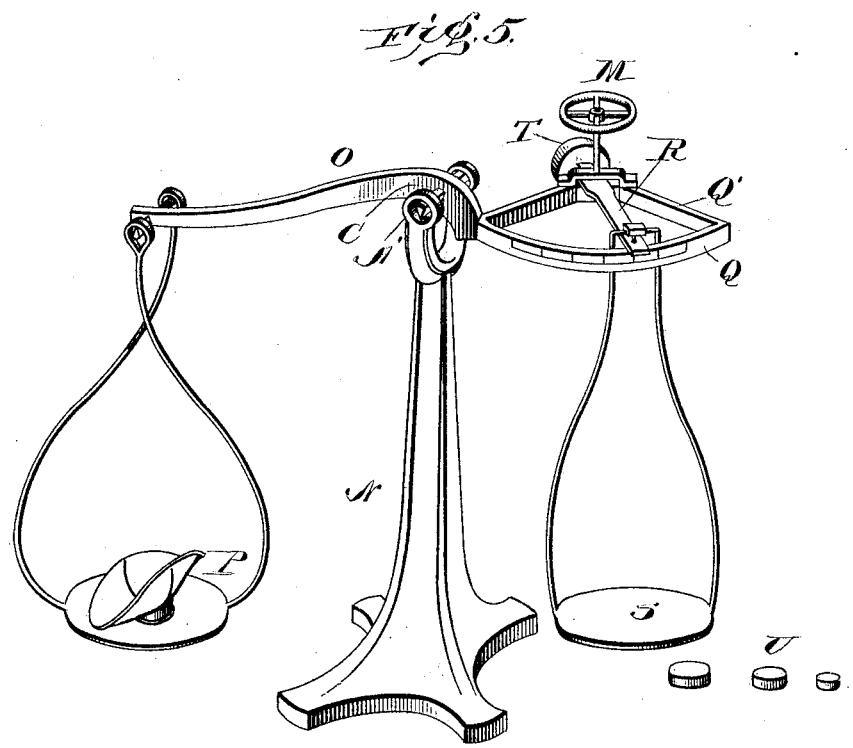

UNITED STATES PATENT OFFICE.

ALBERT N. OZIAS, OF RACINE, WISCONSIN, ASSIGNOR TO THE COMPUTING SCALE COMPANY, OF OHIO.

PRICE-SCALE.

SPECIFICATION forming part of Letters Patent No. 634,831, dated October 10, 1899.

Application filed October 6, 1898. Serial No. 692,829. (No model.)

*To all whom it may concern:*

Be it known that I, ALBERT N. OZIAS, a citizen of the United States, residing at Racine, in the county of Racine and State of Wisconsin, have invented certain new and useful Improvements in Price-Scales; and I do hereby declare the following to be a full, clear, and exact description of the same, reference being had to the accompanying drawings, forming a part of this specification, and to the letters of reference marked thereon.

This invention relates to improvements in scales for indicating the value of articles at different rates per unit, and particularly, though not exclusively, to that class of scales in which the load and the counterbalancing means for the load are applied directly to opposite ends of a beam pivoted in fixed bearings, the object of the invention being to produce a scale of simple construction not liable to get out of order and in which the rate per unit may be varied with great facility.

To these ends the invention consists, primarily, in a scale embodying in its construction a beam with means supported by the beam for varying the point of attachment of the load or the counterbalance for the load with relation to the pivotal center of the beam, which means while located entirely on one side or the other of said pivotal center is counterbalanced in itself to overcome any tendency of the load-supporting devices or the counterbalancing supporting devices to throw the beam out of balance by reason of any difference in leverage exerted thereby.

The invention further consists in certain novel details of construction and combinations and arrangements of parts, all as will be now described, and the particular features of novelty pointed out in the appended claims.

Referring to the accompanying drawings, Figure 1 is a perspective view of a price-scale embodying my present improvements. Fig. 2 is a top plan view of the same. Fig. 3 is a vertical section on the line $x\,x$, Fig. 2. Fig. 4 is a perspective view showing an adaptation of the invention to counter-scales. Fig. 5 is a perspective view showing adaptations of the invention wherein the variation in the rate is secured by varying the leverage exerted by the counterbalancers.

Like letters of reference in the several figures indicate the same parts.

For the purposes of the present application I have shown my present invention as adapted for use in connection with the simplest form of scales—that is to say, scales in which a single lever is mounted in fixed bearings with means for applying the load of the goods to be weighed at one side of the fulcrum and for applying the counterbalance for counterbalancing the goods to be weighed on the other side of the fulcrum—and referring particularly to Fig. 1 it will be seen that the scale illustrated therein, as well as in Figs. 2, 3, and 5, is a scale of the suspended pan or overhead type employing a standard A, springing from a base B and having bearings A' at the top in which a beam C is pivotally mounted in any usual or preferred manner. In Figs. 1, 2, and 3 the right-hand end of the beam is adapted for the application of the counterpoising means, which in the form shown consist, first, of a counterpoise D, sliding on a graduated supplemental beam $d$, and a pan or plate E, suspended from the end of the beam and adapted to receive supplemental weights bearing graduations of value in accordance with the well-known system of "money-weight" scales. The supplemental beam $d$ is properly graduated and bears indications of value thereon in the scale shown in denominations of one cent, running from "0" to "10," meaning from nothing to ten cents. The opposite or left-hand end of the beam in these figures is shown as of a somewhat triangular shape in top elevation, the front bar F being preferably segmental or curved in the arc of a circle struck from the angle formed by the union of the two back bars $f$ and $f'$. At this angle I preferably form a pivotal bearing $g$ for the reception of a counterbalanced load-lever G, which is adapted to swing horizontally and is provided at its forward end with an indicator or edge adapted to register with rate-graduations which are marked on the segment F. The pan H or equivalent load-receiving device is attached to one end of this lever G, while its opposite end is provided with a counterweight I, which will exactly balance the lever and its pan on the center $g$ before referred to. Thus the weight of the load-lever G, together with the pan, is always applied at the same point upon the beam with reference to the pivotal center of the beam, and consequently said load-lever when put in balance with itself may be swung to any point of adjustment without in any wise affecting the balance of the beam; but it is obvious that any additional load applied to the end of the load-lever will affect the beam in a direct ratio to the adjustment of the lever with respect to the pivotal center of the beam, and hence by varying the leverage exerted by the load a rate-scale may be established with uniform value or cost counterbalances adapted to be applied to the opposite arm of the beam.

In the preferred construction the forward end of the counterbalanced load-lever is adapted to contact with the upper surface of the segment when an additional load is applied thereto, and the pan H or other goods-supporting device is preferably carried on a pivotal center, such as $h$, which pivotal center, together with the pivotal center $g$, is preferably in substantially horizontal alinement with the scale-beam pivot and pivot for the supplemental counterpoise-support at the opposite end of the beam, the relationship with respect to the horizon between these three sets of pivots determining the sensitiveness of the scale, although the position of the pivot $g$ is not of so much importance and may be varied considerably without producing material inaccuracy. The pivot $g$ may be prevented from escaping, so as to detach the load-lever by a guard $g'$, and the pivot $h$ may be similarly held by a guard $h'$, while excessive upward movement of the outward end of the load-lever G may be prevented by a guard $h^2$.

In Fig. 4, wherein an adaptation of the scale is shown to an ordinary counter-scale, the letter K indicates a base of any suitable design, and $C^4$ the beam pivotally mounted on said base and having an arm $C^5$, bearing graduations of value, and a pendant $C^6$ for the application of supplemental weights. The left-hand end of the beam preferably overlies the base K and is made with its front and rear edge bars $D^5$ preferably substantially segmental and with a central cross-bar $D^6$. The central cross-bar $D^6$ pivotally supports a load-carrying lever $G^5$, to the forward end of which is attached by a pivotal bearing $g^5$ a counterweight $g^6$. The attachment bearing the counterweight $g^6$ extends upwardly above the load-lever and has rigidly attached thereto a spider for supporting a scoop or platform $g^7$ for the reception of the goods or articles to be weighed, the counterweight serving to maintain the same in its proper position centrally above its pivotal connection with the load-lever. The opposite end of the load-lever supports by a pivotal bearing $g^8$ a second counterweight $g^9$, which is of sufficient weight to bring the whole load-supporting lever, with the parts connected therewith or carried thereby, into a state of balance upon its pivotal connection with the beam, the relationship between the parts in this construction being similar to that secured in connection with Figs. 1, 2, and 3 and permitting the load-lever to be shifted horizontally to any angle without disturbing the balance of the beam itself. For convenience in turning the load-lever on the beam I have provided a hand-wheel M, and the front bar $D^5$ on the wheel may be graduated to indicate rates of value, and one edge of the load-lever may register therewith for convenience in adjusting the parts. The arm $C^5$ of the beam carries a sliding poise $c^5$, adapted to register with the indications of cost on the said arm, and supplemental weights bearing indications of cost may be employed on the pendant for indicating cost-prices higher than the capacity of the beam will permit.

In using either of the forms of scales so far described the load-lever is adjusted to the proper rate-indication either before or after the goods are placed in the receiver and the sliding poise is moved along the opposite arm of the beam to secure a balance, or if the goods are of greater weight than can be balanced by the sliding poise alone supplemental weights are added to secure a balance, and in determining the ultimate cost the values of the supplemental weights are added to the value indicated by the sliding poise, as is usual in price-scales now in common use. To determine what quantity is to be given for a known price a sliding-poise is moved to the desired graduation or the desired number of supplemental weights are placed in position, the load-lever is moved to the desired rate per unit, and the goods are added to secure a balance, all as will be readily understood by those skilled in the art.

The use of a counterbalance-load lever mounted on a center and supported entirely to one side of the pivotal center of the beam, it is obvious, is not confined to a construction wherein the weight of the goods or articles to be weighed is carried by said lever; but the goods or articles may be applied to the arm of the beam and bear a fixed ratio to the pivots of the beam, while the variation in the weight may be secured through the medium of a weight-lever similar to that heretofore described, but adapted to receive counterpoise weights or supplemental weights having a definite value. In Fig. 5 I have illustrated such a construction in a simple form of scale. Referring now to this figure, N indicates a standard or base having a beam O pivotally supported in its upper end and adapted to bear at one of its ends a suspended pan or goods-receiver P for the reception of the goods or articles to be weighed. The opposite arm of the beam is made similar to the left-hand arm of the beam in Fig. 1—that is to say, with a segmental front bar Q and rear bars Q', which at their junction are adapted to pivotally support a load-lever R.

This load-lever carries near its front forward end a bearing, from which a pan or weight-receiver S is suspended, and at its rear end a counterweight T, which will place the said lever and pan S in balance on its own pivot and will permit the said lever to be swung in either direction without disturbing the balance of the beam itself. The segmental front bar of the beam is graduated to indicate rates or unit-prices and a series of segmental weights U are provided to indicate cost-prices. In using a scale of this character the load-lever is adjusted to the desired rate on the beam. The goods are placed on the pan P and the beam brought into balance by the use of supplemental weights U, the combined value of which indicates the cost-price of the goods being weighed.

The precise location of the graduations for indicating rates is obvious and easily determined by experimentation or by mechanical calculation when the length of the arms of the beams and the weights to be handled are known, as is ordinarily done by scale makers and designers in producing a new line of scales.

The pivot for the load-lever, it will be observed, is preferably made so as to permit said lever to move in a vertical as well as in a horizontal plane, the vertical movement being, however, very slight and simply sufficient to enable it to be placed accurately in balance with itself upon its center.

Having thus described my invention, what I claim as new, and desire to secure by Letters Patent of the United States of America, is—

1. In a scales, the combination with a beam pivoted to swing in fixed bearings, of a load-lever pivotally mounted on one of the arms of said beam and out of alinement with the pivotal bearings of the beam, a counterbalance-weight on one arm of said lever, with means for supporting the goods to be weighed and a counterpoise for balancing the same mounted on said lever and arm of the beam opposite that to which the lever is pivoted respectively; substantially as described.

2. In a scales the combination with a beam pivoted to swing in fixed bearings, of a load-lever pivotally mounted on one of the arms of said beam to swing horizontally, a counterbalance-weight carried by one end of said lever, a graduated bar with which said lever registers and the goods-receiver and counterpoising means therefor applied to said lever and the opposite arm of the beam respectively; substantially as described.

3. In a scales the combination with the beam pivoted in fixed bearings, of a load-lever pivotally mounted on one of the arms of said beam and lying wholly to one side of a vertical plane coincident with the axis on which the beam turns a graduated bar on the beam with which said lever is adapted to register, a counterbalance-weight on one arm of the lever, and a goods-receiver and means for counterbalancing the goods placed in said receiver supported by said lever and the opposite arm of the beam respectively; substantially as described.

4. In a scales, the combination with the beam pivoted in fixed bearings, of a load-lever pivotally mounted on one of the arms of said beam, a weight-receiver and a counterweight for balancing said receiver mounted on opposite ends of said lever, whereby the lever may be shifted without changing the balance of the beam and a second weight-receiver supported by the opposite arm of the beam from that upon which the lever is mounted; substantially as described.

5. In a scales, the combination with a beam mounted in fixed bearings to swing in a vertical plane, of a load-lever pivotally mounted on one of the arms of said lever, to swing in a horizontal plane and to a limited extent in a vertical plane, a receiver carried by one end of said lever, a counterweight for balancing said receiver carried by the opposite end of the lever and means for counterbalancing the lever and part supported thereby, carried by the opposite arm of the beam; substantially as described.

6. In a scales, the combination with a beam mounted in fixed bearings, a counterweighted load-lever pivotally mounted on one of the arms of said beam, graduations on the beam for indicating the adjustment of said lever horizontally, a goods-receiver supported on said lever and the counterpoise supported on the opposite arm of the beam from that which supports the lever; substantially as described.

7. The combination with a scale-beam pivoted in fixed bearings and having graduations of cost on one of its arms with a poise for registering with the said graduations, of a horizontally-movable load-lever carried by the opposite arm of said beam, a goods-receiver supported by said load-lever and a counterbalance for said goods-receiver also carried by said lever, whereby the movement of the lever in a horizontal plane will not vary the balance of the beam; substantially as described.

8. In a scales, the combination with the beam pivoted in fixed bearings and having graduations on one of its arms for indicating cost-prices, with a poise for registering with said graduations, of a load-lever pivotally mounted at an intermediate point on the opposite arm of said beam and adapted to swing in a horizontal plane, a goods-receiver supported by one end of said load-lever and a counterpoise-weight on the opposite end of said lever for balancing the lever and goods-receiver on the pivotal center of the lever; substantially as described.

9. In a scales, the combination with the beam, pivoted in fixed bearings and carrying graduations on one of its arms, with a poise for registering with said graduations, of a load-lever pivotally mounted at an intermediate point on the opposite arm of said beam, a goods-receiver pivotally mounted on one end of said lever whereby its vertical position may be maintained, a graduated bar on said beam for indicating the adjustment of the lever and a counterbalance-weight on said lever for counterbalancing the goods-receiver; substantially as described.

10. In a scales, the combination with the base and standard carried thereby, the scale-beam pivotally mounted in the upper end of said standard, graduations on one of the arms of said beam, with a poise for registering therewith, and a segmental graduated bar on the opposite arm of said beam, of a load-lever pivotally mounted on one arm of said beam, a goods-receiver carried by one end of said lever, a counterpoise-weight for balancing said lever on its pivotal center and a supplemental weight-receiver on the opposite arm of the beam; substantially as described.

11. In a scales, the combination with a pivoted beam, having one of its arms extended in substantially straight lines and adapted to support the counterpoise devices and its opposite arm extended in substantially triangular form, of a load-lever pivotally mounted on one of the bars of one arm of the beam, a receiver carried by one end of said lever and a counterpoise-weight carried by the opposite end of said lever with graduations for indicating the adjustment of said lever with relation to the pivots of the beam; substantially as described.

12. In a scales, the combination with the beam pivoted at an intermediate point and having one of its arms extended in a substantially straight line for the application of the counterpoising devices and its opposite arm divided into front and rear branches, of a load-lever pivotally mounted on the rear branch of the last-mentioned arm of the beam, a receiver carried by one end of said load-lever and a counterbalance-weight for said receiver carried by the opposite end of said lever with graduations for indicating the adjustment of the lever with respect to the pivots of the beam; substantially as described.

ALBERT N. OZIAS.

Witnesses:
ARTHUR J. WILBOR,
S. M. PORTER.